Feb. 19, 1957 J. C. HAMPSHIRE 2,781,938
COVERED SKILLET AND BRACKET COMBINATION
Filed Feb. 15, 1955 2 Sheets-Sheet 1
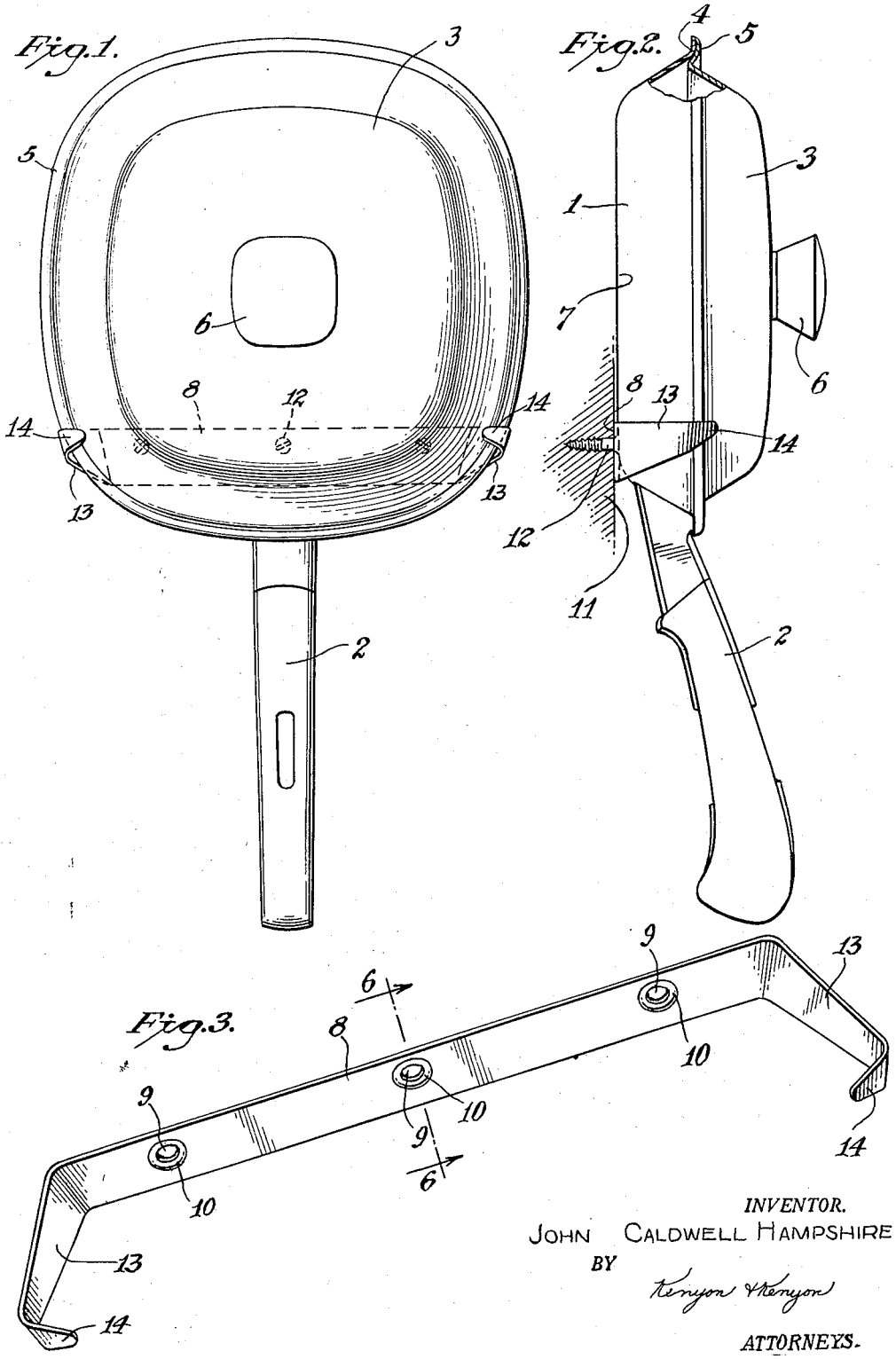
INVENTOR.
JOHN CALDWELL HAMPSHIRE
BY
*Kenyon & Kenyon*
ATTORNEYS.

Feb. 19, 1957 J. C. HAMPSHIRE 2,781,938
COVERED SKILLET AND BRACKET COMBINATION
Filed Feb. 15, 1955 2 Sheets-Sheet 2
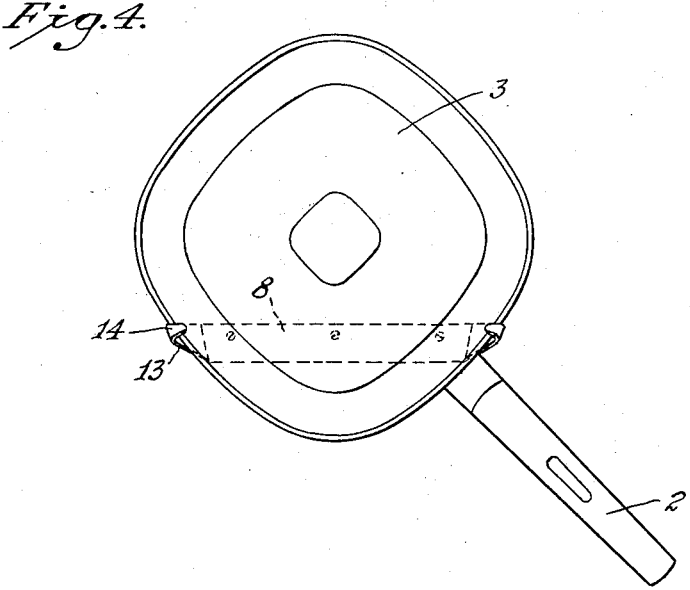
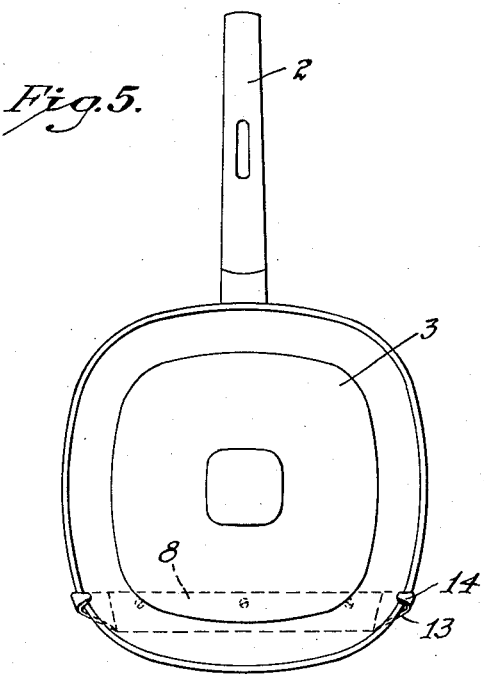
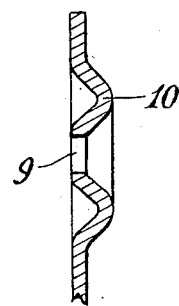
INVENTOR.
JOHN CALDWELL HAMPSHIRE
BY
ATTORNEYS.

United States Patent Office 2,781,938
Patented Feb. 19, 1957

2,781,938

COVERED SKILLET AND BRACKET COMBINATION

John Caldwell Hampshire, New Rochelle, N. Y., assignor to Bridgeport Brass Company, Bridgeport, Conn., a corporation of Connecticut Application February 15, 1955, Serial No. 488,389

5 Claims. (Cl. 220—18)

This invention relates to a covered skillet and bracket combination. Heretofore skillets, sometimes called frying pans, ordinarily have been made with a round contour. Naturally, the covers or lids for such round skillets are also round in contour.

Modern housewives have demanded kitchenware in metals and finishes more attractive than have heretofore been available, and this has led to the production of kitchenware made from stainless steel and having copper bottoms on the skillets or other ware and, more recently, complete copper exteriors. Such domestic hollow ware has become jewel-like in quality and has acquired a heretofore unprecedented decorative value.

With the above in mind, the prior art has made available to the housewise hollow ware in the form of skillets, or frying pans, and other kitchenware utensils, having an exterior which is partly or entirely copper or otherwise decorative, such as a stainless steel exterior, and which are provided with brackets, hooks, and other devices intended to be used for hanging or otherwise displaying the hollow ware in the kitchen primarily for decorative purposes while still making the utensils available for practical culinary use.

Such prior art mounting or fastening means have been designed to display the hollow ware with the bottoms of the skillets, pans, or the like, exposed to view, but this has been effected mainly by suspending the culinary articles in such a manner that the articles are positioned in one manner only and without making any provision whatsoever for locating the covers or lids with which such hollow ware is provided ordinarily. This has left the housewife with the need for storing the lids or covers in drawers and the like and has unduly restricted the housewife's artistic instincts when arranging the skillets or other utiensils in the kitchen for display purposes.

With the foregoing in mind, one of the objects of the present invention is to provide a covered skillet, or other culinary type of vessel, and bracket combination which has the great practical advantages that both the lid or cover and the skillet or other pan or utensil may be mounted together on the kitchen wall or other supporting surface, and so that, in addition, the orientation of the utensil and its cover may be varied by the housewife according to decorative instinct or for other purposes. For example, using the principles of the present invention a plurality of covered skillets or frying pans may, as an individual assembly in each instance, be mounted on a kitchen wall, in each instance, the skillet and its cover or lid being mounted as a unit and the housewife having the opportunity and option of arranging all of the skillets and covers with the handles vertically oriented or oriented diagonally in either direction, according to the housewife's decorative idea or according to the dictates of the general environment of the kitchen. Other objects may be inferred from the following.

A specific example of the present invention is illustrated by the accompanying drawings in which:

Fig. 1 is a front view of a skillet, skillet cover and bracket, in one possible arrangement, the combination embodying the principles of the present invention;

Fig. 2 is a partially sectioned side view of Fig. 1;

Fig. 3 is a perspective showing the details of the bracket;

Fig. 4 is a view similar to Fig. 1 but, on a smaller drawing scale, showing the skillet and skillet cover diagonally oriented;

Fig. 5 is like Fig. 4, but in this instance, showing the skillet and skillet cover inverted; and Fig. 6 is a cross section taken on the line 6—6 in Fig. 3.

More specifically, as shown by Figs. 1 and 2, the novel skillet or frying pan element comprises a body portion 1 of unusual contour in that it is rectangular generally speaking. Other than for this shape the pan may follow the general depth and lateral dimension of prior art skillets and frying pans. As illustrated, a handle 2 projects transversely from one of the generally flat sides of the rectangular skillet or pan shape, about midway between the corner portions adjacent to this side. This handle 2 should project above a plane parallel to the plane of the bottom of the skillet or pan. A cover 3 is provided which, of course, must have the same general contour of the skillet or pan 1, namely, a generally rectangular contour. As shown by Fig. 2 the skillet or pan 1 has a peripheral edge flange 4, and the cover 3 has a corresponding peripheral edge flange 5 which overlies the flange 4 when the cover 3 is superimposed on the skillet or pan 1. The two flanges 4 and 5 are radially concavo-convex, in each instance, so that they interlock, when pressed together, with respect to lateral displacement relative to each other. Although not absolutely necessary for the present invention, the cover 3 is preferably provided with a knob 6 for facilitating the manipulation of the cover 3 in connection with raising and lowering the latter from the skillet or pan 1 when the latter is in use on a stove. As also shown by Fig. 2 the bottom of the skillet 1, indicated at 7, forms a flat plane which is of some importance in connection with the use of the utensil for cooking purposes on a stove, but which is of even greater importance in connection with the display of the skillet and its cover.

As previously indicated both the skillet 1 and its cover 3 may be made from cladmetal. In one very attractive form the insides of the skillet and the cover comprise layers of relatively highly polished stainless steel, while their outsides are in the form of layers of relatively highly polished copper. In other instances the exteriors of the two parts may comprise layers of relatively highly finished stainless steel. In all instances the external appearance is very attractive and the skillet and cover have considerable utility in the direction of being a part of a modern kitchen's decor.

With the above in mind, the illustrated assembly or combination further includes a bracket shown in detail by Fig. 3 and shown in combination with the other components by Figs. 1 through 5. This bracket comprises a flat, straight, elongated portion 8 having a plurality of holes 9 formed therethrough with embossments 10 formed around each hole so that flat-headed wood or metal screws may be passed therethrough for fastening the flat portion 8 against a supporting wall. The embossments form conical seats for the heads of such screws and, in addition, form smoothly rounded forwardly extending projections. The wall, to which the bracket is fastened, will ordinarily be the kitchen wall, an attractive panel installed on the kitchen wall, kitchen door, or the like. Figs. 2 through 5 show the bracket portion installed against such a wall surface 11 by the described type of flat-headed screws 12, it being understood that the flat portion 8 is horizontally arranged in most installations.

At each end of the portion 8 the bracket projects forwardly to form forwardly projecting arms 13 which are flat and angled away from each other to conform generally to the shape of the skillet's side portions. These arms 13 should each have lengths approximately equalling the depth of the skillet or pan 1 from its flange 4 down to its bottom 7. The portion 8 has an extent substantially equalling the width of the rectangular skillet bottom. At the forward or outer end of each of the arms 13 a finger 14 projects inwardly as shown in detail by Fig. 3 and as shown in use by Figs. 1 through 5. The idea is that the arms 13 may embrace any two opposite or adjacent sides of the skillet or pan 1 while the fingers 14 overlie both of the flanges 4 and 5 so as to permit mounting of both the skillet or pan 1 and its cover 3. These flanges are transversely curved, as explained previously, so as to interlock under the finger pressure and hold the skillet and lid mutually registered. Note that the cover 3 is snugly secured to the skillet or pan 1 so that no dirt can get inside of the skillet or pan and its cover.

Although described as being generally rectangular, the skillet or pan contour is more that of a rectangular shape generally having rounded corners at all of its four corner locations and having generally convex side portions at all of its four side portions. The flanges 4 and 5 are, of course, the same shape. Both the skillet or pan 1 and its cover 3 are generally symmetrical about the center of the assembly. These general shape limitations are of importance in connection with the described bracket because the group of parts form a combination having the unique advantages previously indicated.

It is to be understood that all of the bracket portions may be formed from a single piece of metal which preferably but not necessarily is the same metal as that from which the exteriors of the skillet or pan and its cover are made. Thus, when the skillet and pan have a copper exterior layer the bracket shown by Fig. 3 is preferably formed from a single piece of copper, and when the exterior of the parts 1 and 2 is formed by a stainless steel layer the bracket may be made from stainless steel.

Normally the front of the bracket is highly polished. The embossments 10 function to space the bottom of the skillet or pan from the front of the bracket when the combination is assembled. This prevents scratching or marring of the main or panel portion of the bracket and makes it practical to give this portion a highly polished finish. The embossments also function to provide countersinks for the heads of the flat-headed screws.

In use, the bracket of Fig. 3 is screwed on the wall, panel or other location in the kitchen by the flat-headed screws 12, the bracket being oriented substantially horizontally. The housewife takes the skillet or pan and cover, illustrated by Figs. 1 through 5, and having the shape and structural features previously described, and with the cover in place places the assembly in the fashion shown by any of Figs. 1 through 5. The bracket not only serves to mount the skillet or pan but, in addition, secures the cover firmly in place so that a unitary structure results. Because the pan and its cover are symmetrical the housewife may place the skillet or pan and its cover diagonally in the bracket so that the arms 13 embrace two adjacent sides of the assembly, as shown by Fig. 4, or two opposed sides as is illustrated by Fig. 1. Thus, a diagonal mounting of the skillet and cover is possible, and this orientation may be changed so that the handle 2 may be extended vertically downwardly or roughly at a 45° angle to either the left or the right, depending upon the housewife's ideas of decor appropriate to the kitchen where the assembly is installed. The skillet or pan and its cover may be inverted as shown by Fig. 5.

The above is of particular importance when the housewife uses a plurality of the assemblies, this being desirable because the skillet or pan and bracket assemblies are available commercially in three different sizes forming a set. It can be seen that the present invention has great practical advantages over the prior art arrangements wherein pans, skillets and the like, made partly of stainless steel and partly of copper, for example, are hung in the kitchen by the handle only and without any provision for the covers or lids. Heretofore this is all that has been available to the public from the manufacturers of kitchen hollow ware made of stainless steel or combinations of stainless steel and copper alloys.

Preferably, the forwardly projecting bracket portions 13, or arms, not only angle away from each other, longitudinally speaking, but also they angle downwardly towards each other with respect to their transverse directions. The fingers 14 preferably angle outwardly from the main portion of the bracket. By contouring or orienting the bracket parts in this fashion the skillet and its cover wedge or nest snugly in all directions, except upwardly, in the bracket parts. The brackets parts are springy and wedge the lid on tightly. Nothing is apt to be scratched or marred during repeated removals and replacements of the skillet or pan and its cover. The decorative effects are widely variable.

I claim:

1. A cooking and decorating ensemble comprising a skillet having an outwardly extending peripheral flange; a lid for said skillet and having an outwardly extending flange shaped to fit on said skillet flange in superimposed relation; both of said flanges being of generally rectangular contour and having slightly convex side portions; and a wall bracket having arms which project forwardly at locations straddling two opposite ones of said flange side portions adjacent to the lower corners of said skillet, and fingers which project towards each other and over the adjacent portions of said lid flange so as to both mount said skillet and lid and hold the lid on the skillet when said arms straddle either two opposite sides or two mutually adjacent sides of said skillet; whereby said skillet and lid may be oriented either vertically or angularly on said bracket according to decorative taste.

2. A cooking and decorating ensemble comprising a skillet having an outwardly extending peripheral flange; a lid for said skillet and having an outwardly extending flange shaped to fit on said skillet flange in superimposed relation; both of said flanges being of generally rectangular contour and having slightly convex side portions; and a wall bracket having a portion forming a substantially flat surface and provided with forwardly extending projections engaged by the bottom of said skillet, arms which project forwardly at locations straddling two opposite ones of said flange side portions adjacent to the lower corners of said skillet, and fingers which project towards each other and over the adjacent portions of said lid flange so as to both mount said skillet and lid and hold the lid on the skillet when said arms straddle either two opposite sides or two mutually adjacent sides of said skillet; whereby said skillet and lid may be oriented either vertically or angularly on said bracket according to decorative taste; said flanges having interfitting transversely curved shapes holding said skillet and lid against relative transverse motion and maintaining their mutual registration.

3. A cooking and decorating ensemble comprising a skillet having an outwardly extending peripheral flange; a lid for said skillet and having an outwardly extending flange shaped to fit on said skillet flange in superimposed relation; both of said flanges being of generally rectangular contour and having slightly convex side portions; and a wall bracket having arms which project forwardly at locations straddling two opposite ones of said flange side portions adjacent to the lower corners of said skillet, and fingers which project towards each other and over the adjacent portions of said lid flange so as to both mount said skillet and lid and hold the lid on the skillet when said arms straddle either two opposite sides or two mutually adjacent sides of said skillet; whereby said skillet and lid may be oriented either vertically or angularly on said bracket according to decorative taste; said fingers being springy and being angled so that said flanges wedge beneath said fingers.

4. A cooking and decorating ensemble comprising a skillet having an outwardly extending peripheral flange; a lid for said skillet and having an outwardly extending flange shaped to fit on said skillet flange in superimposed relation; both of said flanges being of generally rectangular contour and having slightly convex side portions; and a wall bracket having arms which project forwardly at locations straddling two opposite ones of said flange side portions adjacent to the lower corners of said skillet, and fingers which project towards each other and over the adjacent portions of said lid flange so as to both mount said skillet and lid and hold the lid on the skillet when said arms straddle either two opposite sides or two mutually adjacent sides of said skillet; whereby said skillet and lid may be oriented either vertically or angularly on said bracket according to decorative taste; said arms being springy and being angled so that said flanges wedge therebetween.

5. A cooking and decorating ensemble comprising a skillet having an outwardly extending peripheral flange; a lid for said skillet and having an outwardly extending flange shaped to fit on said skillet flange in superimposed relation; both of said flanges being of generally rectangular contour and having slightly convex side portions; and a wall bracket having a portion forming a substantially flat surface and provided with forwardly extending projections engaged by the bottom of said skillet, arms which project forwardly at locations straddling two opposite ones of said flange side portions adjacent to the lower corners of said skillet, and fingers which project towards each other and over the adjacent portions of said lid flange so as to both mount said skillet and lid and hold the lid on the skillet when said arms straddle either two opposite sidese or two mutually adjacent sides of said skillet; whereby said skillet and lid may be oriented either vertically or angularly on said bracket according to decorative taste; said flanges having interfitting transversely curved shapes holding said skillet and lid against relative transverse motion and maintaining their mutual registration; said arms and fingers being springy and being in each instance angled so that said flanges wedge beneath said fingers and between said arms.

References Cited in the file of this patent

UNITED STATES PATENTS

| | | |
|---|---|---|
| 2,021,065 | Hurlburt | Nov. 12, 1935 |
| 2,325,712 | Shurmur | Aug. 12, 1943 |
| 2,621,825 | Lyon | Dec. 16, 1952 |

FOREIGN PATENTS

| | | |
|---|---|---|
| 740,340 | France | Nov. 14, 1932 |